United States Patent
Tsiatsis et al.

(10) Patent No.: US 11,201,917 B2
(45) Date of Patent: Dec. 14, 2021

(54) USER DEVICE, A FIRST PEER NODE, AND METHODS IN A COMMUNICATIONS NETWORK

(71) Applicant: Telefonaktiebolaget LM Ericsson (publ), Stockholm (SE)

(72) Inventors: Vlasios Tsiatsis, Solna (SE); Craig Donovan, Bromma (SE); Athanasios Karapantelakis, Stockholm (SE); Maxim Teslenko, Sollentuna (SE); Aneta Vulgarakis Feljan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 610 days.

(21) Appl. No.: 16/087,355

(22) PCT Filed: Mar. 23, 2016

(86) PCT No.: PCT/EP2016/056349
§ 371 (c)(1),
(2) Date: Sep. 21, 2018

(87) PCT Pub. No.: WO2017/162279
PCT Pub. Date: Sep. 28, 2017

(65) Prior Publication Data
US 2021/0211494 A1    Jul. 8, 2021

(51) Int. Cl.
*H04L 29/08* (2006.01)
*H04L 12/10* (2006.01)

(52) U.S. Cl.
CPC .......... *H04L 67/1074* (2013.01); *H04L 12/10* (2013.01); *H04L 67/1051* (2013.01); *H04L 67/303* (2013.01)

(58) Field of Classification Search
CPC . H04L 67/1074; H04L 12/10; H04L 67/1051; H04L 67/303
See application file for complete search history.

(56) References Cited

U.S. PATENT DOCUMENTS

| | | | |
|---|---|---|---|
| 2008/0192666 A1 | 8/2008 | Koskan et al. | |
| 2011/0225305 A1 | 9/2011 | Vedantham et al. | |
| 2012/0324245 A1* | 12/2012 | Sinha | G06F 1/30 713/300 |

OTHER PUBLICATIONS

International Search Report and Written Opinion dated Nov. 16, 2016 issued in International Application No. PCT/EP2016/056349. (10 pages).

(Continued)

*Primary Examiner* — Brian Whipple
(74) *Attorney, Agent, or Firm* — Rothwell, Figg, Ernst & Manbeck, P.C.

(57) ABSTRACT

A method performed by a first peer node for acting as a P2P proxy for a user device is provided. The first peer node operates in a communications network. The first peer node establishes (201) a renewable energy profile of the first peer node used for powering the first peer node. The renewable energy profile indicates to what extent one or more energy sources are renewable. When a proportion of renewable energy according to the established renewable energy profile exceeds a first threshold, the first peer node acts (205) as a P2P proxy for the user device for downloading a piece of data to the user device by being powered according to its renewable energy profile.

20 Claims, 8 Drawing Sheets

(56) References Cited

OTHER PUBLICATIONS

European Patent Office Communication dated Jan. 22, 2020 issued in European Patent Application No. 16711627.6. (7 pages).

* cited by examiner

| Entry # | Info ID | Peer ID | Peer IP address:port | Other P2P system specific information e.g. Timestamp of last ping | Additions according to embodiments herein ||||||
|---|---|---|---|---|---|---|---|---|---|---|
| | | | | | 1) Sustainable Proxy capable? | 2) Sustainable Proxy currently? | 3) Energy source type | 4) Sustainability percentage | 5) Availability | 6) Location | 7) Location accuracy |
| 1 | afc45e | 234de | 192.168.1.10 0:3456 | | Yes | No | PV, Wind | 80%, 20% | 08:00-22:00 | Stockholm | Radius of 1KM |
| ... | | | ... | | | ... | | | ... | ... | ... |
| N | 67dea | sdfgj2 | 192.168.1.12 0:6745 | | Yes | Yes | Battery from PV | 80% | 23:00-04:00 | Kista | Radius of 500m |

USER DEVICE, A FIRST PEER NODE, AND METHODS IN A COMMUNICATIONS NETWORK

CROSS REFERENCE TO RELATED APPLICATION(S)

This application is a 35 U.S.C. § 371 National Stage of International Patent Application No. PCT/EP2016/056349, filed Mar. 23, 2016, designating the United States.

TECHNICAL FIELD

Embodiments herein relate to a first peer node, a user device and methods therein. In particular, they relate to the first peer node acting as a P2P proxy for the user device, and to download by the user device a piece of data from the first peer node when acting as a P2P proxy for the user device.

BACKGROUND

File sharing is the practice of distributing or providing access to digital media, such as computer programs, multimedia e.g. audio, images and video, documents or electronic books. File sharing may be achieved in a number of ways. Common methods of storage, transmission and dispersion include manual sharing utilizing removable media, centralized servers on computer networks, World Wide Web-based hyperlinked documents, and the use of distributed Peer-to-Peer (P2P) networking and communication.

P2P communication is the most time-efficient method for downloading large-sized content of a data file.

P2P file sharing is the distribution and sharing of digital media using P2P networking technology. P2P file sharing allows a user of a user device to access media files such as books, music, movies, and games using a P2P software program that searches for other connected computers on a P2P network to locate the desired content or pieces thereof. The nodes, i.e. the peers also referred to as peer nodes, of such networks are end-user equipment, such as end user computer systems that are interconnected via the Internet. The nodes are capable of both being providers, also known as uploaders, or consumers, also known as downloaders, of content simultaneously. The terms downloader and uploader or downloading and uploading are associated with a specific peer node. Therefore when two peer nodes, PNA and PNB, are involved in an exchange of a piece of data, and PNA is downloading from PNB, then PNB is uploading to PNA.

In the following description the terms file, piece of content, piece of data, part of a piece of data, piece of information, information piece, content, content of a data file, data and digital media are used interchangeably, and they all mean a set of digital bits stored in a storage media representing information desired by the user.

P2P file sharing technology has evolved fundamentally the recent decade of years e.g. depending on increasing Internet bandwidth, the widespread digitization of physical media, and the increasing capabilities of residential personal computers. Users were able to transfer either one or more files from one computer to another across the Internet through various file transfer systems and other file-sharing networks.

Energy efficient P2P systems have been researched in the literature mainly in the last 5-10 years. In a typical use of P2P, users are interested in fastest downloads of the desired content which often consumes a lot of energy, and which often is not the most environment-friendly approach.

SUMMARY

It is therefore an object of embodiments herein to improve the way of consuming environment-friendly energy when downloading data from a peer node in a communications network.

According to a first aspect of embodiments herein, the object is achieved by a method performed by a first peer node for acting as a P2P proxy for a user device. The first peer node operates in a communications network. The first peer node establishes a renewable energy profile of the first peer node used for powering the first peer node. The renewable energy profile indicates to what extent one or more energy sources are renewable. When a proportion of renewable energy according to the established renewable energy profile exceeds a first threshold, the first peer node acts as a P2P proxy for the user device for downloading a piece of data to the user device by being powered according to its renewable energy profile.

According to a second aspect of embodiments herein, the object is achieved by a method performed by a user device, for downloading a piece of data from a first peer node acting as a P2P proxy for the user device. The first peer node operates in a communications network. The user device selects the first peer node among a number of available peer nodes. Each peer node out of the number of peer nodes is associated to a level of renewable energy profile. The renewable energy profile indicates to what extent one or more renewable energy sources are used for powering the peer node. The selecting is based on the renewable energy profile of the peer nodes. A proportion of renewable energy according to the renewable energy profile of the first peer node 131 exceeds a first threshold. The user device sends to the first peer node, a request for downloading the piece of data. The user device then downloads at least part of the piece of data from the selected first peer node, which first peer node is powered according to its renewable energy profile.

According to a third aspect of embodiments herein, the object is achieved by a first peer node for acting as a P2P proxy for a user device. The first peer node is operable in a communications network. The first peer node is configured to:

Establish a renewable energy profile of the first peer node used for powering the first peer node. The renewable energy profile is adapted to indicate to what extent one or more energy sources are renewable.

When a proportion of renewable energy according to the established renewable energy profile exceeds a first threshold, act as a P2P proxy for the user device for downloading a piece of data to the user device by being powered according to its renewable energy profile.

According to a forth aspect of embodiments herein, the object is achieved by a user device for downloading a piece of data from a first peer node acting as a P2P proxy for the user device. The first peer node is operable in a communications network. The user device is configured to:

Select the first peer node among a number of available peer nodes. Each peer node out of the number of peer nodes is adapted to be associated to a level of renewable energy profile. The renewable energy profile is adapted to indicate to what extent one or more renewable energy sources are used for powering the peer node. The selecting is adapted to be based on the renewable energy profile of the peer nodes. A proportion of renewable energy according to the renewable energy profile of the first peer node is adapted to exceed a first threshold.

Send to the first peer node, a request for downloading the piece of data, and

Download at least part of the piece of data from the selected first peer node, which first peer node is adapted to be powered according to its renewable energy profile.

An advantage of embodiments herein is that it allows a user device to download a piece of data in a sustainable manner. It also helps P2P infrastructure to operate in a sustainable manner.

BRIEF DESCRIPTION OF THE DRAWINGS

Examples of embodiments herein are described in more detail with reference to attached drawings in which:

FIG. 5 depicts embodiments of a DHT table.

DETAILED DESCRIPTION

Figure 1:
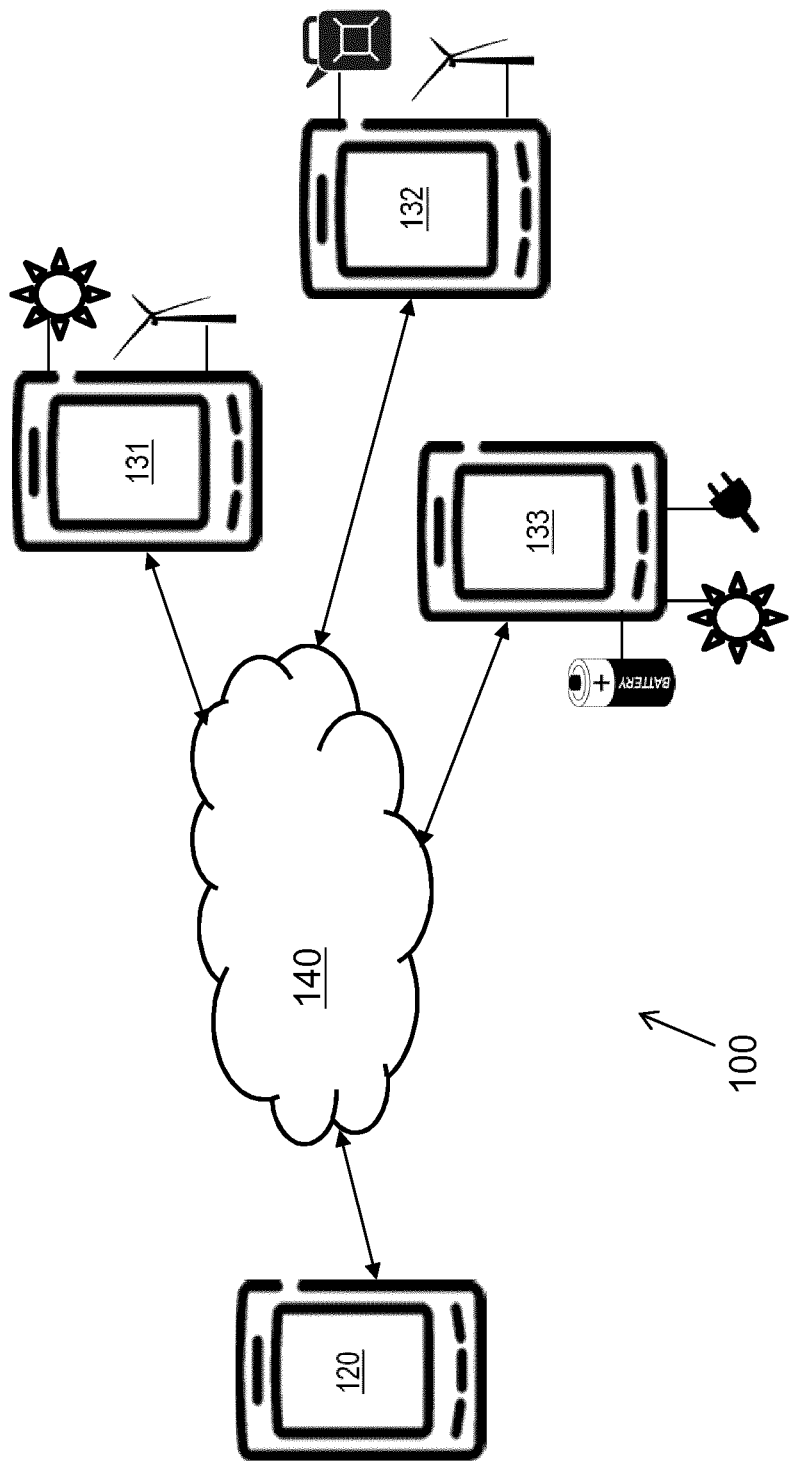
FIG. 1 is a schematic block diagram illustrating embodiments of a communications network.

As part of developing embodiments herein a problem was first identified and will be discussed below:

As mentioned above, P2P communication is the most time-efficient method for downloading large-sized content of a data file. Typically user self-interest forces P2P users to demand fastest download as opposed to sustainable or energy efficient downloads. Moreover P2P clients don't provide sustainability options to users that would be willing to sacrifice some of the download time in order to download an item in the most sustainability-efficient manner.

Downloading a piece of data with the least energy is one way to achieve a sustainable P2P download. Currently there is no P2P client and infrastructure that is energy-type aware and there are no nodes and methods for energy type aware clients. The energy efficient P2P literature focuses more on having the clients and the whole downloading process energy efficient, but not optimized in terms of sustainability.

In the energy efficient P2P literature there is one architectural solution called P2P proxy solution. A P2P proxy is a node that is constantly on and consuming energy and which could be tasked by other P2P peer nodes to become a P2P node for the P2P network when the other peer nodes are sleeping and thus conserve energy.

A P2P proxy (P2PP) may assume the downloading and uploading duties of another peer node PNA while the PNA is offline conserving energy. A downloading duty may be described in a formal language and comprises the desired pieces of content that peer node would like to download when offline and other information such as requirements or constraints. The download duty formal description may be stored in a text file and disseminated from a peer node PNA to a proxy P2PP. An uploading duty may also be expressed in a formal language and stored in a text file which can be disseminated to a peer node PNA to a proxy P2PP. In the least, an uploading duty may comprise a list of pieces of content that PNA has on its storage media and which other peer nodes may desire to download.

A problem is that peer nodes involved in download according to prior art are not energy-type aware for today's user and network equipment.

Peer nodes involved in downloading of data according to embodiments herein are energy-type aware.

In the following description the terms renewable-aware, energy-type aware and sustainability-aware are used interchangeably and they all mean that awareness of the level of sustainability for each energy source that powers a node.

Embodiments herein provide P2P clients that provide to a user device, a choice of downloading a piece of data in a sustainable way or not from a peer node acting as a proxy. Moreover the peer node acting may detect and disseminate to other peer nodes the fact that they are connected to a sustainable energy source e.g. a solar panel and they are available for a certain amount of time because of limited solar energy availability.

Note that the files, such as e.g. documents, audio, video, software executables and libraries, etc., that are shared in the P2P system herein may be encrypted with Digital Rights Management (DRM) protection schemes. In such schemes, the owner of the file encrypts the file, which is subsequently shared. The peer, such as e.g. a user device downloading the file has to request permission from the owner in order to view, play, execute and/or use the file downloaded.

FIG. 1 depicts an example of a communications network 100 in which embodiments herein may be implemented. The communications network 100 may comprise any one or more out of: GSM, GSM EDGE Radio Access Network (GERAN), 3G, LTE, Wi Fi, Wireless Local Area network (WLAN), WiMax, Code Divisional Multiple Access (CDMA) 2000, LTE-NX, Massive MIMO systems, fixed wireless, wired etc. EDGE is the abbreviation for Enhanced Data Rates for GSM Evolution, and NX LTE means next-generation 5G radio access technology.

One or more user devices operate in the communications network 100, whereof a user device 120 is shown in FIG. 1. According to an example scenario herein, the user device 120 wishes to download a piece of data in an environment-friendly way from a peer node operating in the communications network 100.

The user device 120 may e.g. be a user equipment, a wireless or wired device, a mobile wireless terminal or a wireless terminal, a wired terminal, a mobile phone, a computer, such as e.g. a laptop, a Personal Digital Assistants (PDAs) or a tablet computer, sometimes referred to as a tablet, with wireless or wired communication capabilities, or any other network units capable to communicate over a link in a wireless or a wired communications network. Please note the term UE used in this document also covers other wireless or wired devices such as Machine to machine (M2M) devices.

A plurality of peer nodes operate in the communications network 100 whereof three peer nodes, a first peer node 131, a second peer node 132 and a third peer node 133 are depicted in FIG. 1. The peer nodes 131, 132, 133 involved in data download according to embodiments herein are aware of what energy type they are powered by. Thus each peer node out of the number of peer nodes 131, 132, 133 is associated with a renewable energy profile associated with renewable energy sources used for powering the peer node. The renewable energy profile indicates to what extent one or more energy sources are renewable.

The peer nodes 131, 132, 133 may e.g. be endpoints, routers, etc. or any of a user equipment, a wireless or wired device, a mobile wireless terminal or a wireless terminal, a wired terminal, a mobile phone, a computer such as e.g. a laptop, a Personal Digital Assistants (PDAs) or a tablet computer, sometimes referred to as a tablet, with wireless or wired communication capabilities, or any other network units capable to communicate over a link in a wireless or wired communications network. Please note the term peer node used in this document also covers other wireless or wired devices such as Machine to machine (M2M) devices.

The peer nodes 131, 132, 133 may e.g. be dynamic P2P proxy nodes which are assumed to be connected to a machine that e.g. is a) connected to a renewable power source e.g. photovoltaic cell or wind turbine or b) is aware of the type of energy delivered to it e.g. "green", from renewables, water; "grey" e.g. from burning trash or "red" from dirty sources of power such as fossil fuels.

A dynamic P2P proxy is a P2P node that may assume different roles depending on the availability of a sustainable source of energy attached to the machine that hosts the P2P node. A P2P node can be either a normal P2P client or a P2P proxy. Instead of being fixed P2P proxy nodes that always are up and running each of the peer nodes 131, 132, 133 may become a P2P proxy for the duration of the time that that the peer node 131, 132 or 133 is powered with renewable energy.

The term renewable energy sources used herein comprises renewable energy sources, such as hydroelectricity, solar energy, wind energy, wave power, geothermal energy, bio-energy, tidal power.

Green Energy is energy that can be extracted, generated, and/or consumed without any significant negative impact to the environment. The planet has a natural capability to recover which means pollution that does not go beyond that capability can still be termed green.

Green electrical power is a subset of renewable energy and represents those renewable energy sources and technologies that provide the highest environmental benefit and may be defined as electricity produced from solar, wind, geothermal, biogas, biomass and low-impact small hydroelectric sources. Customers often buy green power for minimum environmental impacts and its greenhouse gas reduction benefits.

The user device 120 may also be a peer node that is renewable energy aware, but according to the examples described herein, the user device 120 acts as the node wishing to download a piece of data from any of the renewable energy aware peer nodes 131, 132, 133 or wishing to upload a piece of data already stored on the user device 120 to any of the renewable energy aware peer nodes 131, 132, 133.

The terms "energy type aware", "energy-type aware" and "renewable energy aware" are interchangeably used.

The user device 120 and the peer nodes 131, 132, 133 operating in the communications network 100 may be connected with each other via the Internet 140 such as for downloading a piece of data.

Embodiments herein provide a sustainable P2P protocol whose endpoints such as the user device 120 are aware of the type of energy powering up the peer nodes 131-133 and whose endpoints are using the least energy consumption possible.

The method will first be described from the first peer node 131 perspective, then from user device 120 perspective. The method will then be described more in detail and exemplified further below.

Figure 2:
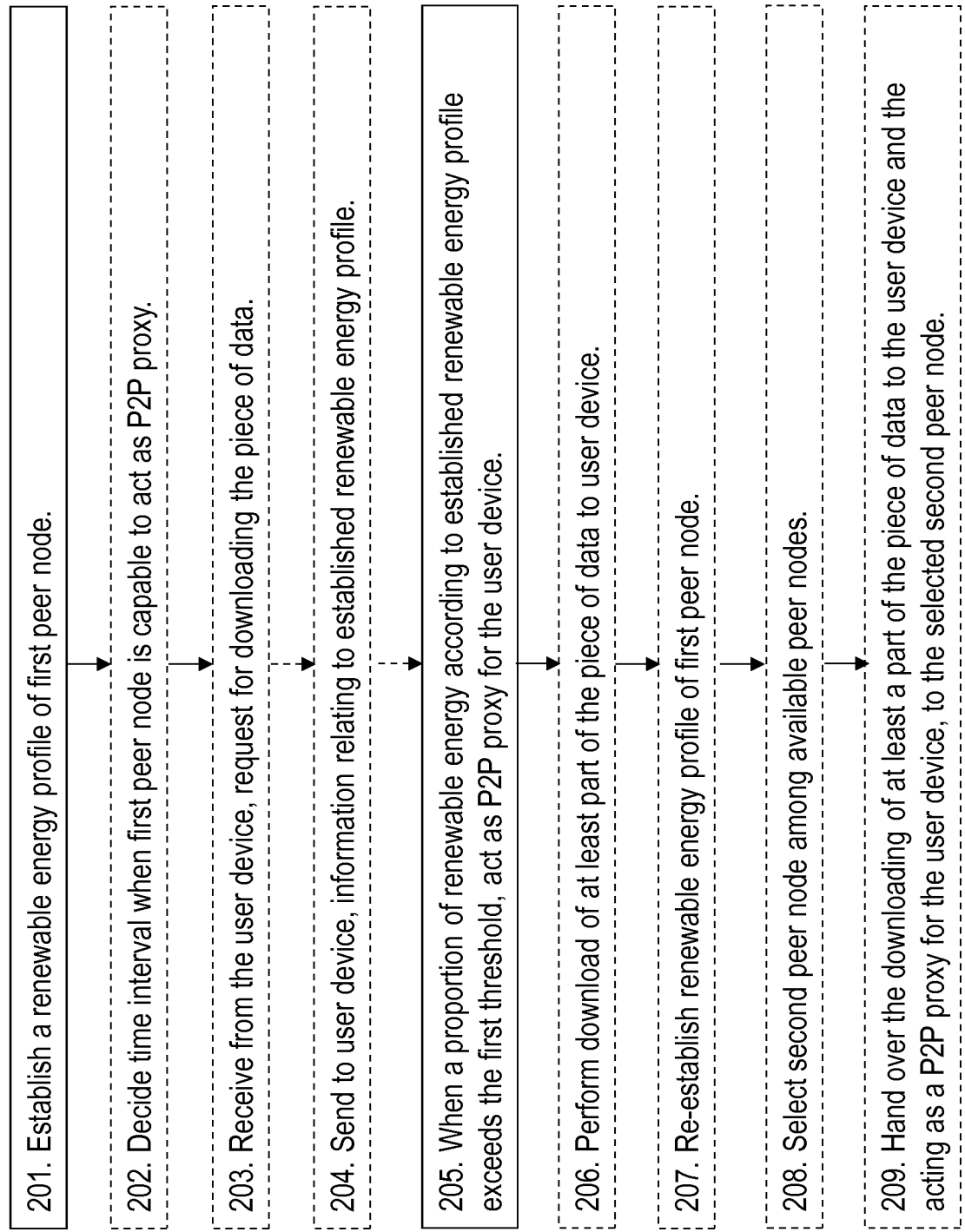
FIG. 2 is a flowchart depicting embodiments of a method in a first peer node.

Example embodiments of a method performed by a first peer node 131 for acting as a P2P proxy for a user device 120 will now be described with reference to a flowchart depicted in FIG. 2. As mentioned above, the first peer node 131 operates in the communications network 100.

The method comprises the following actions, which actions may be taken in any suitable order. Actions that are optional are presented in dashed boxes in FIG. 2.

Action 201

According to embodiments herein, the first peer node 131 is capable to act as a P2P proxy for the user device 120 for downloading the piece of data to the user device 120 by being powered according to its renewable energy profile, only when a proportion of renewable energy according to the established renewable energy profile exceeds a first threshold. Therefore the first peer node 131 establishes a renewable energy profile of the first peer node 131 used for powering the first peer node 131. The renewable energy profile indicates to what extent one or more energy sources are renewable. The first threshold, the energy profile and its portions will be discussed more in detail below.

In some embodiments, the first peer node 131 is connected to a sensor. In these embodiments the establishing of the renewable energy profile of the first peer node 131 is based on information related to renewable energy sources provided by the sensor.

The sensor may e.g. be a sensor capable of sensing light, wind, temperature, vibration, sea water level, etc.

Action 202

The availability of a renewable energy to power the first peer node 131 may vary over time. In some embodiments, the proportion of renewable energy according to the established renewable energy profile exceeds the first threshold only during a time interval. In these embodiments, the first peer node 131 is capable to act as a P2P proxy for the user device 120 during that time interval. The renewable energy profile may comprise information about the time interval when the first peer node 131 is capable to act as a P2P proxy for the user device 120.

The first peer node 131 may decide the time interval when the first peer node 131 is capable to act as a P2P proxy for the user device 120 based on obtained information relating to any one or more out of: information about the duration of daylight, trash burning, sunrise and sunset times, weather forecast that includes forecast of wind speed, sunlight, amount of clouds, amount of rain In the embodiments wherein the first peer node 131 is connected to a sensor, the time interval when the first peer node 131 is capable to act as a P2P proxy for the user device 120 may start when the sensor modality sensed in the sensor is above a second threshold and stops when modality sensed in the sensor is below a third threshold. This will be further described in detail below.

Action 203

According to an example scenario, the user device 120 wishes to download a piece of data in an environment-friendly way from a peer node powered in by a renewable energy source. In some embodiments, the first peer node 131 receives from the user device 120, a request for downloading the piece of data. This action may as an alternative be performed before action 201. The request may in some embodiments comprise a wished renewable energy profile of the first peer node 131 for the downloading, or the user device 120 may already have chosen the first peer node since its renewable energy profile matches the demand of the user device 120.

Action 204

In some embodiments the user device 120 selects a peer node based on what type of energy it is powered by. One way to enable this is to transfer the established renewable energy profile to the user device 120. Thus, the first peer node 131 may send information to the user device 120. The information relates to the established renewable energy profile. In some embodiments the information is sent to the user device as a response to the request for downloading the piece of data. This may be transmitted automatically, e.g. via a coordinating node also referred to as a tracker node that keeps track of peer nodes that are capable to act as a P2P proxy. In these embodiments, the first peer node 131 may have been selected by the user device 120 based on the information about the established renewable energy profile.

Action 205

When a proportion of renewable energy according to the established renewable energy profile exceeds the first threshold, the first peer node 131 acts as a P2P proxy for the user device 120 for downloading a piece of data to the user device 120 by being powered according to its renewable energy profile.

Action 206

When the first peer node 131 acts as a P2P proxy for the user device 120 and is powered according to the established renewable energy profile, the first peer node 131 may in these embodiments perform the download of at least part of the piece of data to the user device 120.

Action 207

As mentioned above, the availability of a renewable energy to power the first peer node 131 may vary over time. In some embodiments, the first peer node 131 re-establishes the renewable energy profile of the first peer node 131. The re-established renewable energy profile may still exceed the first threshold. However, in an example scenario, the first peer node 131 realises that the re-established renewable energy profile no longer exceeds the first threshold.

Action 208

In the example scenario, the first peer node 131 has realised that the re-established renewable energy profile does no longer exceed the first threshold. The first peer node 131 may then select a second peer node 132 among the number of available peer nodes 131, 132, 133. As mentioned above each peer node out of the number of peer nodes 131, 132, 133 is associated with a renewable energy profile used for powering the peer node. The renewable energy profile indicates to what extent one or more energy sources are renewable. The selecting is based on that a proportion of renewable energy according to the renewable energy profile of the second peer node 132 exceeds the first threshold.

The selecting of the second peer node 132 among the number of available peer nodes 131, 132, 133 may further be based on any one or more out of: the geographical distance to the user device 120, the network distance such as e.g. the number of communication links between two peer nodes, and the future availability of renewable energy exceeding the first threshold.

Action 209

When the first peer node 131 has selected a second peer node 132 e.g. in Action 208, the first peer node 131 hands over the downloading of at least a part of the piece of data not already being downloaded to the user device 120 and the acting as a P2P proxy for the user device 120, to the selected second peer node 132.

Regarding different duties of a user device 120 handed over to a proxy device such as the peer node 131 before the user device 120 goes offline, there may be three types of requests a device 120 may send to another peer node such as the first peer node 131:

(a) Request to download a piece of content in a sustainable way when both the user device 120 and the peer node 131 are up and online. Sustainable way means as stated in the current text of the application when the node 131 sustainability profile exceeds a threshold.

(b) Request from the user device 120 to the peer node 131 for the peer node 131 to download on behalf of the user device 120 a piece of content C while the user device 120 is offline. When the user device 120 comes back online it requests for this piece of content C to be downloaded to the user device 120. This is the download duty as referred to above. The choice of the first peer node 131 may also be made with the threshold method as the request in (a).

(c) Request from the user device 120 to the peer node 131 for the peer node 131 to host any pieces of content stored on the user device 120 so that the per node 131 provides these pieces of content to other peer nodes etc. This refers to the upload duty mentioned above. The choice of peer node 131, 132, 133 may be made with the threshold method as the request in (a).

Now the method will be described from the user device 120 perspective.

Figure 3:
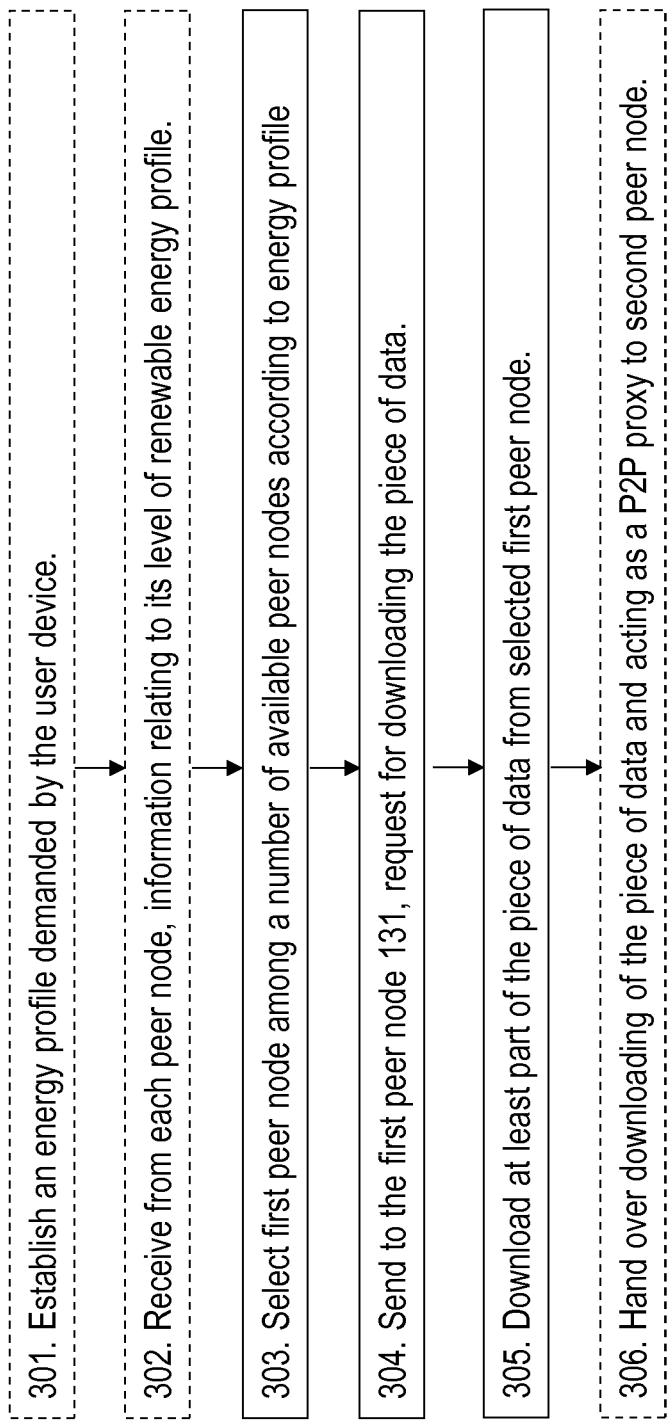
FIG. 3 is a flowchart depicting embodiments of a method in a user device.

Example embodiments of method performed by a user device 120, for downloading a piece of data from a first peer node 131 acting as a P2P proxy for the user device 120, will now be described with reference to a flowchart depicted in FIG. 3. As mentioned above, the first peer node 131 operates in a communications network 100.

The method comprises the following actions, which actions may be taken in any suitable order. Actions that are optional are presented in dashed boxes in FIG. 3.

Action 301

According to an example scenario, the user device 120 wishes to download a piece of data in an environment-friendly way from a peer node powered in by a renewable energy source. In some embodiments, the user device 120 establishes an energy profile demanded by the user device 120 to be fulfilled by a peer node 131, 132, 133 to act as a P2P proxy for the user device 120 to download the piece of data.

The established energy profile is fulfilled when the proportion of renewable energy according to the renewable energy profile of a peer node exceeds the first threshold.

In some embodiments, the first threshold has been selected by the user device 120 for the downloading of the piece of data to the user device 120.

Action 302

The user device 120 may receive from each peer node out of the number of peer nodes 131, 132, 133, information relating to its level of renewable energy profile. By means of this information, the user device 120 may decide which peer node out of the number of peer nodes 131, 132, 133 to use for downloading a piece of data. See Action 303.

Action 303

The user device 120 selects the first peer node 131 among a number of available peer nodes 131, 132, 133. Each peer node out of the number of peer nodes 131, 132, 133 is associated to a level of renewable energy profile. The renewable energy profile indicates to what extent one or more renewable energy sources are used for powering the peer node 131, 132, 133. The selecting is based on the renewable energy profile of the peer nodes 131, 132, 133.

The proportion of renewable energy according to the renewable energy profile of the first peer node 131 exceeds a first threshold. I.e. the first peer node 131 is selected since its renewable energy profile exceeds the first threshold.

In some embodiments, the proportion of renewable energy according to the renewable energy profile of the first peer node 131 exceeds the first threshold only during a time interval. In these embodiments, the first peer node 131 may only be capable to act as a P2P proxy for the user device 120 during that time interval.

The time interval when the first peer node 131 is capable to act as a P2P proxy for the user device 120 may be based on information relating to any one or more out of: information about the duration of daylight, trash burning, sunrise and sunset times, weather forecast that includes forecast of wind speed, sunlight, amount of clouds, amount of rain.

The selecting of the first peer node 131 among a number of available peer nodes 131, 132, 133, may further be based on any one or more out of: the geographical distance to the user device 120, the network distance, such as e.g. the number of communication links between two peer nodes, and the future availability of renewable energy exceeding the first threshold.

Action 304

In some embodiments, the user device 120 may send to the first peer node 131, a request for downloading the piece of data. The user device may e.g. include information about an energy profile demanded by the user device 120 to be fulfilled by a peer node 131, 132, 133 to act as a P2P proxy for the user device 120 to download the piece of data.

Action 305

The user device 120 then downloads at least part of the piece of data from the selected first peer node 131, which first peer node 131 is powered according to its renewable energy profile.

Action 306

It may happen that the proportion of renewable energy according to the renewable energy profile of the first peer node 131 no longer exceeds the first threshold.

In that case the downloading of the piece of data and the acting as a P2P proxy for the user device 120 may be handed over to a second peer node 132. The second peer node 132 is selected by the first peer node 131 among the number of available peer nodes 131, 132, 133. As mentioned above, each peer node out of the number of peer nodes 131, 132, 133 is associated to a level of renewable energy profile. The renewable energy profile indicates to what extent one or more renewable energy sources are used for powering the peer node 131, 132, 133. The selecting is based on that a proportion of renewable energy according to the renewable energy profile of the second peer node 132 exceeds the first threshold. The handover happened between the P2P Proxy 131 and P2P proxy 132 but if the node 120 is offline it needs to find out somehow. The user device 120 may find out about the handover of the downloading duty from the first peer node 131 to the second peer node 132 by discovering through any known P2P procedure the desired pieces of information again when the device 120 comes up online.

The user device 120 may download at least a part of the piece of data not already being downloaded to the user device 120 from the second peer node 132, which second peer node 132 is powered according to its renewable energy profile.

As mentioned above, the methods described above will now be exemplified and described more in detail. The description below may refer to any embodiment above.

As mentioned above, the time interval when the first peer node 131 is capable to act as a P2P proxy for the user device 120 may e.g. follow the sun in case the first peer node 131 is powered by sun energy.

According to an example scenario, the first peer node 131 may be any machine connected to a Photovoltaic (PV) cell which has declared itself to be a proxy capable peer node and take part in the P2P overlay network for a time interval as long as the sun illuminates the PV cells which here results in that the proportion of renewable energy according to the renewable energy profile of the first peer node 131 exceeds the first threshold, and maybe for some more time if the excess energy is stored in batteries. The rest of the peer nodes (other user devices such as 120) connect to the closest proxy or peer node (that offers the desired piece of content) in order to minimize the energy consumption of communication data packets.

When the energy reserves of the first peer node 131, when it acts as a proxy are close to running out and the proportion of renewable energy according to the renewable energy profile of the first peer node 131 no longer exceeds the first threshold, the first peer node 131 may discover another proxy candidate such the second peer node 132 is selected by the first peer node 131 among the number of available peer nodes 131, 132, 133. The second peer node 132 may e.g. also be connected to a PV cell and being illuminated by the sun for a time interval of a few hours, during which time interval the proportion of renewable energy according to the renewable energy profile of the second peer node 132 exceeds the first threshold. The first peer node 131 moves i.e. hands over to the new P2P proxy candidate which is the second peer node 132, the piece of data which may be files or parts thereof, i.e. at least a part of the piece of data not already being downloaded to the user device 120, descriptions of desired content to be downloaded referred to as "downloading duty" or descriptions of content that other peer nodes can download from the current proxy node referred to as "uploading duty descriptions". The P2P nodes such as the first peer node 131 may be pointed to the new proxies such as the second peer node 132 by means of a P2P protocol. The user device 120 then downloads from the second peer node 132, at least a part of the piece of data not already being downloaded to the user device 120, which second peer node 132 is powered according to its renewable energy profile as a result of the node 132 being powered by PV cells.

Figure 4:
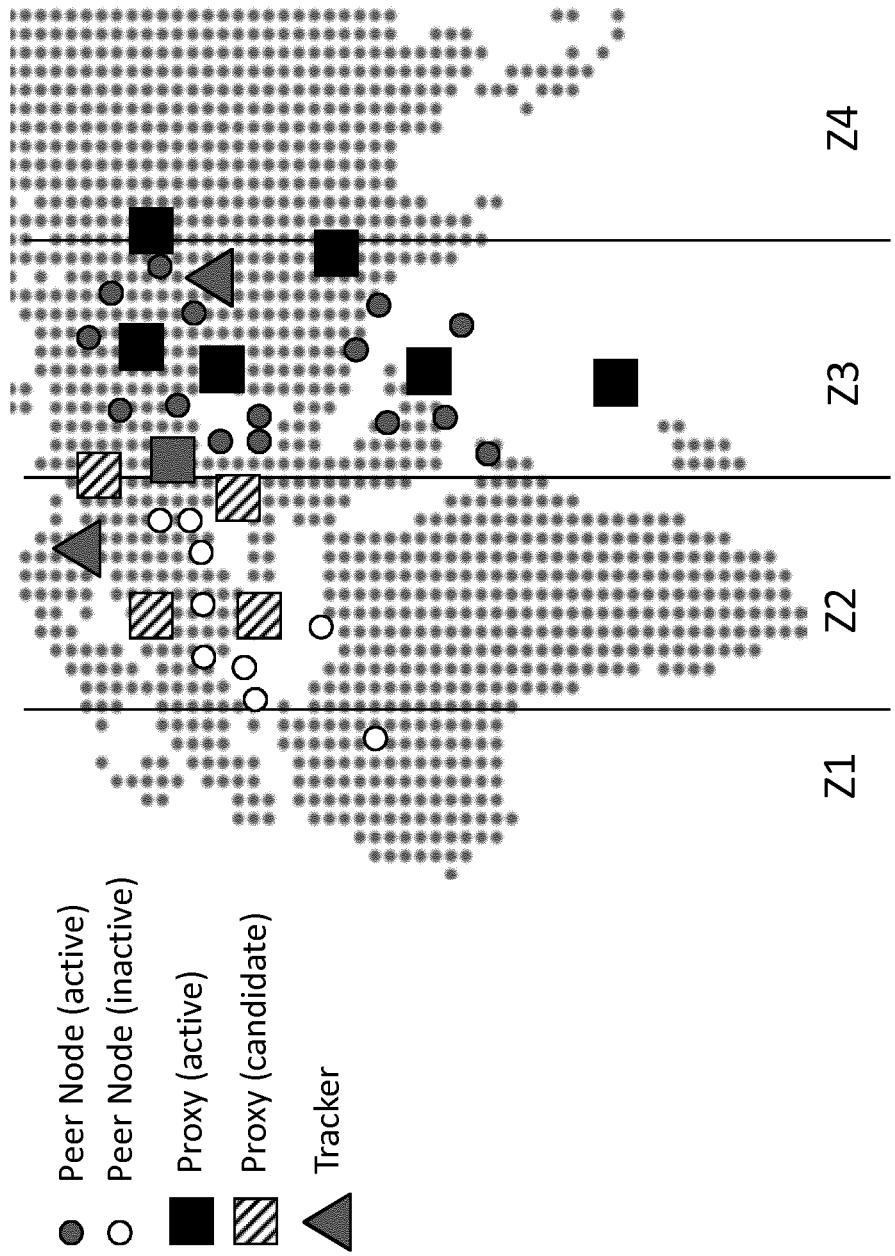
FIG. 4 schematic block diagram illustrating embodiments of a communications network.

FIG. 4 shows an example of a setup of the communications network 100. The setup comprises types of nodes or roles for P2P nodes according to embodiments herein. The set up comprises normal peer nodes such as the peer nodes 131, 132, 133 that may be active or inactive, also referred to as sleeping. The set up further comprises peer nodes acting as proxies, referred to as Proxy in FIG. 4, such as e.g. the peer nodes 131, 132 according to earlier examples herein, which may be active or candidates. The set up may further comprise tracker nodes referred to as Tracker in FIG. 4, which are not necessarily needed but used in some embodiments. The area where there is sunlight and potential for PV powered peer nodes may also be separated in zones, such as zones Z1-Z4 in FIG. 4, in the sense that a certain zone contains proxy nodes with a guaranteed lifetime of e.g. 3 hours, i.e. for a time interval of 3 hours, during which time interval the proportion of renewable energy according to the renewable energy profile of the peer node in the certain zone exceeds the first threshold.

A P2P protocol for an existing proxy node such as the first peer node 131 to notify a candidate proxy such as the second peer node 132 takes into account the candidate proxy sustainability features and/or characteristics such as the proportion of renewable energy according to the renewable energy profile of the candidate, such as the second peer node 132 when it is connected to a PV cell or a wind turbine or receives energy from a green source for P % of the time. P is a system parameter. Then one of the current proxies, such as the first peer node 131, may chose a candidate proxy, such as the second peer node 132, based on the future availability of the candidate, proximity, and current active load, and notifies the candidate to become an active proxy transferring all the state e.g. which client, such as the user device 120, that is connected and the downloaded content so far. The connected P2P nodes, such as the user device 120 rediscover the new proxies such as the second peer node 132 or are notified to change proxies. New peer nodes such as the user device 120 coming out of the hibernation mode may discover their nearby proxies, such as the first or second peer nodes 131, 132 and start downloading the piece of data.

If clients such as the user device 120 do not have time to download a piece of data from a nearby proxy or they can choose to download the next time, e.g. the following day, the proxy becomes available again, such as from the first peer node 131 again. The word nearby means close in terms of geographical distance or network distance.

The tracker nodes when used, hold information e.g. about which peer nodes such as the peer nodes 131, 132, 133 that may be proxies, their approximate location as opposed to absolute location, e.g. for privacy reasons, and their green energy reserves such as the proportion of renewable energy according to the renewable energy profile, active proxy nodes as well as clients such as the user device 120 that interrogate the tracker nodes for this information. Typically even in non-P2P networks the communication protocols have an identifier of the host/node in a network e.g. IP address. This IP address does not translate directly to a precise geographical location because Internet Service Providers (ISP) don't reveal their customer's precise geographical location. Similarly a P2P protocol may not have the precise geographical location but it may have an approximate one e.g. the node is somewhere in central Stockholm because a P2P node is also a host/node in an ISP network and subject to the same regulation as non-P2P nodes.

In case peer nodes 131, 132, 133 such as the P2P endpoints or proxies can detect the type of energy delivered to their power supplies they determine the proportion of renewable energy according to the renewable energy profile, such as the percentage of time also referred to as the time interval e.g. 20% of the day for the next day that they should be available for being green dynamic P2P proxies based on the percentage of green energy they consumed during the previous day. In other words the time interval when a proportion of renewable energy according to the established renewable energy profile exceeds the first threshold.

Embodiments herein also comprises distributed proxy discovery with tracker-less P2P system.

The discovery of a peer node that is capable to act as a proxy holding the necessary data content may be performed automatically by a tracker-less P2P protocol. Typically a tracker-less P2P system comprises a Distributed Hash Table (DHT) and the discovery of peer nodes such as the peer nodes 131, 132, 133, that contain file pieces, such as the piece of data described above, is done using the DHT. The DHT according to embodiments herein is extended with information about the type of energy source the peer node is connected to and the availability, e.g. in terms of time of this energy source. Approximate location of the peer node may also be included in the DHT. Therefore the information on the DHT may comprise the following pieces as depicted in the table FIG. 5. FIG. 5 comprises approximate DHT table with existing and additional information according to embodiments herein. One example of the renewable energy profile of the peer nodes 131, 132, 133 is the DHT table according to embodiments herein depicted in FIG. 5.

The already existing entries in some form or another in DHTs today are the following: The Entry # is the sequence number of the DHT table. The Info ID identifies the information stored in the peer node's 131, 132, 133 data store, and it may be for example the hash of a binary piece of data or content. The Peer ID is a unique identifier of the peer node 131, 132, 133 that contains the specific piece of content in the P2P system and its contact information is the Peer IP address and port. A DHT may also have information about the reliability of the peer node 131, 132, 133, such as if it provided correct information in the last 15 minutes or not.

According to embodiments herein, one or more additional data fields are provided into the DHT, such as e.g.:

1) Whether the peer node 131, 132, 133 is sustainable proxy capable or not, e.g. if it is connected to one or more renewable sources of energy.

2) Whether or not the peer node 131, 132, 133 is currently a sustainable proxy, i.e. currently acts as a proxy node.

3) The main type or types of sustainable source of energy, also referred to herein as renewable energy sources.

4) The greenness/sustainability percentage. If more than one energy sources, to what extent one or more energy sources are renewable. E.g. 50% renewable energy sources. A further alternative may be the percentage of time that the peer is powered from renewable or sustainable energy sources, assuming the rest of the time when the peer is on it is powered by non-sustainable sources. The threshold is associated with decisions and this is a description of a DHT field. The sustainability percentage is used along with the first threshold for a peer node to select a P2P proxy candidate or for a P2P proxy to select a P2P proxy candidate to hand over the proxy duties. A third alternative is that the percentage actually represents the percentage of time that the proportion of renewable energy according to the established renewable energy profile exceeds the first threshold. This may be the time interval the proportion of renewable energy according to the established renewable energy profile exceeds the first threshold, compared to a reference time interval, such as twelve hours of solar energy per day is 12/24=0.5 or 50.

5) The peer node 131, 132, 133 time availability, e.g. current and future, in order for other peer nodes 131, 132, 133 to schedule content pull or push, in case of a peer node 131, 132, 133 acting as a proxy or the current peer node such as the first peer node 131 downloading something, 6) An approximate geographical location of the peer node 131, 132, 133.

7) Location accuracy of the peer node 131, 132, 133, e.g. radius of 1 km. In the case of the of the peer nodes 131, 132, 133 powered by a sustainable source of energy also referred to as renewable source of energy, whose output can be predicted, e.g. by weather or by a request to the schedule of e.g. trash burning factory, the availability information may be filled in automatically by an appropriate method. In other words and as mentioned above, the peer node 131, 132, 133 may have access to a weather service that provides the solar coverage or the wind information throughout the day or may be equipped or connected to a sensor as described above. The peer node 131, 132, 133 may estimate the electricity or energy availability based on this information and automatically fill in the data in the availability and the sustainability percentage columns. The location and location accuracy may be set so that it fulfills the privacy requirements of the user devices such as the user device 120 operating the sustainable P2P infrastructure such as the communications network 100.

In the case of the "follow the sun" principle the idea also includes a method for a current peer nodes, such as 131, 132, 133 when acting as a proxy to a) notify a peer node that is candidate to act as a proxy, when the time is approaching the time window of availability of the candidate as well as b) transfer the current data pieces shared to other peer nodes 131, 132, 133. The user devices such as the user device 120 currently connected to a peer node acting as a proxy such as the first peer node 131 which is about to shutoff, e.g. because it is approaching the end of the time window of availability, may be notified to use a new peer node such as the second peer node 132 that can act as a proxy. The "follow the sun" principle does not have to include exact information about the zones as shown in FIG. 4 and protocol exchanges to implement zones. If the time availability column is automatically updated from information about the sustainable energy source time availability and the protocol for proxy hand over then the zones will be enforced in practice. The zones do not have to be geographically continuous as shown in FIG. 5 although this may be true for solar energy sources. For wind energy sources the zones may be rather patches in the map where the wind is available. For trash burning power plants there may not be any zones. Note that the terms renewable and sustainable are used interchangeable in this document.

In some embodiments, the user device 120 selects a desired sustainability level, also referred to as the first threshold. When a proportion of renewable energy according to the established renewable energy profile of the peer node 131, 132, 133 exceeds the first threshold, a peer node such as 131,132,133 is approved to act as a P2P proxy for the user device 120. The user device 120 may be able to select the sustainability level, i.e. the first threshold of the peer node 131, 132, 133 running a P2P protocol using different criteria. For example the user device 120 may indicate that it wants to download the data from a peer connected to a solar cell, also referred to as the solar criterion as shown Table 1 below. Table 1 and Table 2 are only examples of a sustainability criterion or first threshold and may have other forms as well.

Thus the format of Table 1 and Table 2 below is only presented as non-limiting examples. There are four columns, a sustainability criterion column, a percentage column, a Min and Max column and a Time Availability column. The sustainability criterion provides the energy source potentially powering a peer node 131, 132, 133. The percentage column provides a threshold percentage of this energy source contribution to the total energy reserves of the peer node 131, 132, 133. The sum of threshold percentages of a sustainability level should not exceed 100%. The threshold percentages can be minimum or maximum (indicated by the Min and Max columns) meaning that the first threshold or sustainability level may require the contribution of a specific energy source (for example solar in Table 1) to be at least the number indicated in the percentage column if Min is YES. If the Max column is YES then the value in the percentage column indicated the maximum percentage allowed for the corresponding source of energy. Since embodiments herein are about sustainability aware P2P system typically the Min column for sustainable sources of energy is YES and the MAX column NO and the Min column is NO and the Max column is YES for non-sustainable energy sources. In the case of Table 1 a user device will select a peer node 131, 132, 133 if the peer node is at least 100% powered by solar. The Time Availability column indicates a requirement about the future availability of the corresponding energy source. This column may be formatted to contain the date in a year as well as the time of the day. Table 1 provides an example in which the peer node that matches the sustainability criteria or the first threshold should be powered 100% by a solar energy between 08:00-15:00 the next day. Table 2 below presents an example of a sustainability level used by a user device 120 that contains a mix of energy sources and a mix of minimum and maximum requirements. The meaning of Table 2 is the following: a user device 120 selects a peer node 131, 132, 133 if it is powered at least 50% by solar and at least 20% by wind energy and at most by 15% by non-sustainable sources of energy. A peer node 131, 132, 133, may also be powered by other types of sustainable sources of energy (e.g. geothermal or trash) but the requirement for a user device 120 to select one of them based on the other sources of energy is not mandatory.

TABLE 1 user device 120 selection for downloading a specific piece of data or piece of content or file from only solar energy powered peers.
Info ID: afc45e

| Sustainable Criterion | Percentage | Min | Max | Time Availability |
|---|---|---|---|---|
| Solar | 100% | YES | NO | 08:00-15:00 |
| Wind | 0% | NO | NO | — |
| Geothermal | 0% | NO | NO | — |
| Trash | 0% | NO | NO | — |
| Non-sustainable sources | 0% | NO | YES | — |

TABLE 2 user device 120 selection for downloading a specific piece of data or piece of content or file from a mix of peer nodes connected to sustainable and non-sustainable sources of energy.
Info ID: afc45e

| Sustainable Criterion | Percentage | Min | Max | Time Availability |
|---|---|---|---|---|
| Solar | 50% | YES | NO | 08:00-15:00 |
| Wind | 20% | YES | NO | 09:00-10:00 |
| Geothermal | 0% | NO | NO | — |
| Trash | 0% | NO | NO | — |
| Non-sustainable sources | 15% | NO | YES | — |

For the purposes of this document a sustainable P2P protocol also referred to as a renewable energy P2P protocol is the one whose endpoints are aware of the type of energy powering up the peer nodes and whose endpoints preferable use the least energy consumption possible.

Figure 6:
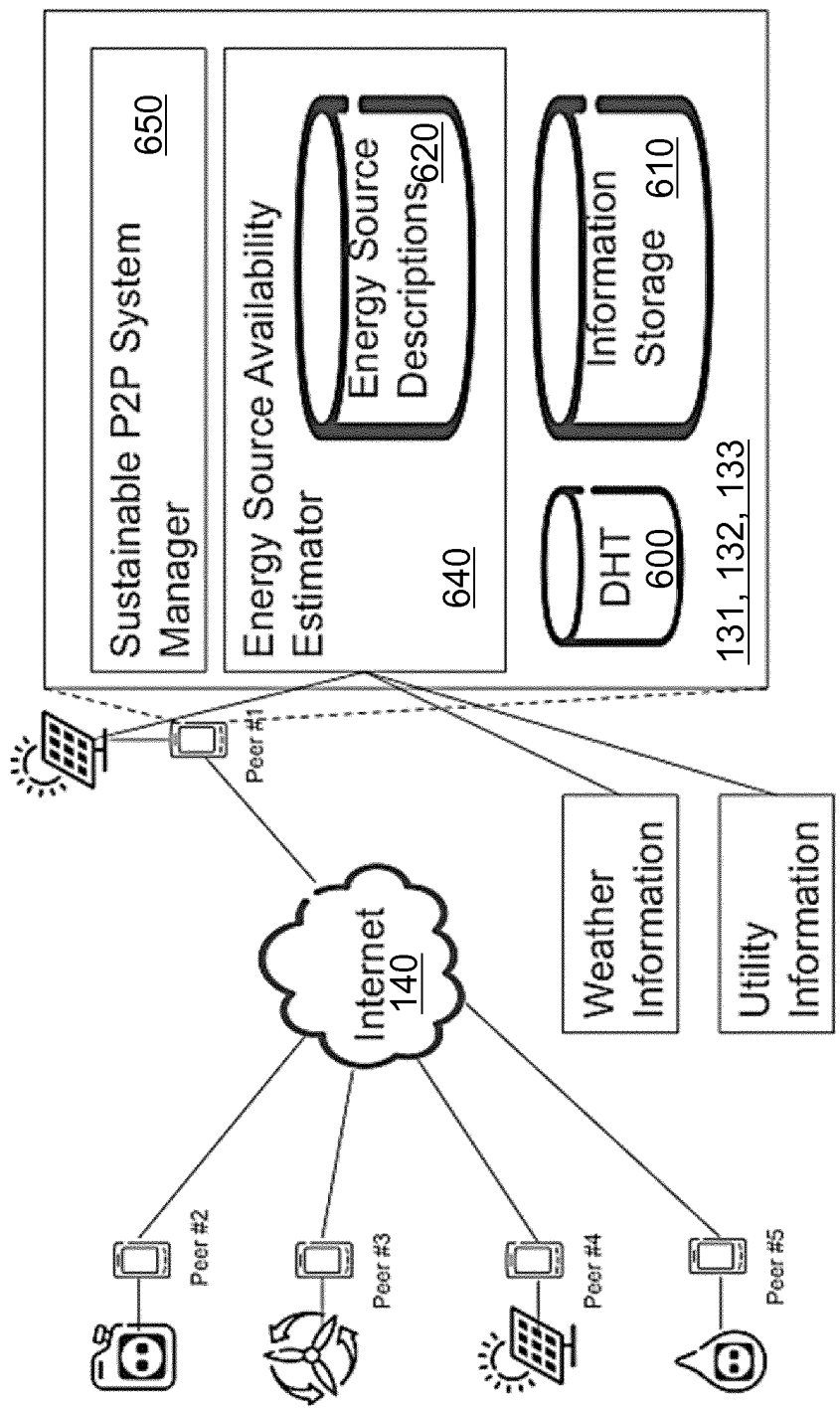
FIG. 6 is a schematic block diagram illustrating embodiments of a communications network.

FIG. 6 shows an example of system functions of a tracker-less P2P system such as the communications network 100 according to embodiments herein. The tracker-less P2P system comprises of a number of peer nodes referred to as Peer #1-Peer #5 in FIG. 6 which may e.g. be any of the peer nodes 131, 132, 133. Each peer node comprises a common set of methods and/or functions and there is no central entity such as a tracker node that coordinates the operation of the system.

The information maintained by each peer node 131, 132, 133 is a) the DHT 600, b) Information Storage 610 comprising information pieces or pieces of content that other peer nodes need to download from the current peer node such as 131, 132, 133, c) Energy Source Descriptions (ESD) 620 which are used for describing the energy source types such as the renewable energy profile of the peer node 131, 132, 133. E.g. renewable solar, renewable wind, renewable water, non-renewable fossil fuel, semi-renewable trash etc. as well as the time and percentage availability of them to power the current peer node 131, 132, 133. The information in the DHT captures the energy source description information such as the renewable energy profile of the peer node 131, 132, 133 as well as the information storage description for other peer nodes while the local information storage and energy descriptions capture the local node respective information.

The functions of a peer node 131, 132, 133 are a) an Energy Source Availability Estimator (ESAE) 640 which uses and updates the Energy Source Descriptions 620 based on direct exchange of information with the energy sources powering up the peer node 131, 132, 133. The way the information is transferred from the local energy source to the Energy Source Availability Estimator 640 may be performed by continuous measurements of the output of each energy source with respect to voltage and potentially electric current and the output of the different sensors attached to each energy source or peer node. The weather information may be provided by weather report web services that a peer node has access to via the Internet. The information from the energy utility company providing the energy to the peer node may be provided by a Utility provided system as a service to their customers in the context of the future vision of a Smart Grid. A device connecting to the Smart Grid is assumed to have access to availability and price information coming from the Utility Company and transferred in a way that is out of scope for this solution. Moreover an energy utility company may provide an Application Programming Interface (API) to let the Energy Source Availability Estimator 640 to receive the characterization of the energy provided to the peer node 131, 132, 133, e.g., 80% renewable from wind and 20% fossil fuel. Further the function of the tracker-less P2P system is the Sustainable P2P System Manager (SP2PSM) 650, which is responsible for the operation of the P2P protocols, the maintenance of the DHT and the change of roles of the peer node 131, 132, 133 from a regular peer to a proxy node.

Energy Source Update on the Peer Node

Any of the peer nodes 131, 132, 133 may collect the information from the different available Energy Sources (ES) such as e.g. ES directly connected to it, any batteries connected to the peer node 131, 132, 133 as well as information about the energy provided to the peer node 131, 132, 133 e.g. by means of utility company information, weather information or the battery having the energy characterization stored on it. It is differentiated between ES and batteries herein because ES are assumed to provide the energy and the information about the energy type such as e.g. green, grey and red instantaneously, while a battery which is charged by an ES needs to collect this information over time and build up an energy profile by itself. Every time an energy source or any other information source updates the ESAE 640, the ESAE 640 updates the internal ESD 620 of the energy source descriptions and potentially triggers the SP2PSM 650 to take a decision whether the node is proxy capable or not, i.e. exceeds the first threshold. The SP2PSM 650 may also periodically check the ESDs 620 to decide if the hosting peer node 131, 132, 133 can be proxy capable. E.g. as mentioned above, the peer nodes 131, 132, 133 are capable to act as a P2P proxy for the user device 120 for downloading the piece of data to the user device 120 by being powered according to its renewable energy profile, only when a proportion of renewable energy according to the established renewable energy profile exceeds a first threshold. The decision whether peer nodes 131, 132, 133 are capable to act as a P2P proxy and thus fulfil the first threshold will be based on the availability of clean and sustainable energy to the node (up to P %) for the next N hours where the clean and sustainable energy availability percentage P and the number of hour N are configuration parameters. For example if based on the information on the ESD 620 the peer node 131, 132, 133 will have 80% of its energy coming from renewable sources for the next 5 hours then this peer node 131, 132, 133 exceeds the first threshold and is proxy capable for the next 5 hours.

The first threshold comprises minimum requirements on the percentage of sustainable energy sources and maximum requirements on the percentage of the non-sustainable sources of energy powering a peer node. Moreover, it also contains future time availability requirements on the different energy sources powering up a peer node such as the peer nodes 131, 132, 133. Examples and detailed explanations of the requirements contained in the first threshold are provided in Table 1 and Table 2 above.

Deciding to Become Proxy Capable and Proxy Duty Transfer

A peer node such as the second peer node 132 may for example decide to become proxy capable for the next N hours since a proportion of renewable energy according to its established renewable energy profile exceeds the first threshold. It updates the DHT 600 information with the proxy capability flag to be True. Any other peer node or user device 120 that decides to assign a proxy duty to the second peer node 132, communicates with peer node 132 and transmits the duty of downloading or uploading or both. Any other peer node such as the first peer node 131 acting as a proxy that decides to offload the duty to this second peer node 132, communicates with the peer node and handshakes the handover of the responsibility. Moreover the old proxy such as the first peer node 131 transfers the state such as the DHT 600 information, user device 120 and information pieces to the new proxy such as the second peer node 132. The DHT 600 of the new proxy such as the second peer node 132 is updated with the availability information of the new information pieces.

Proxy Acting Peer Node Deciding to Handover Proxy Duty

An existing proxy acting peer node such as the first peer node 131 may decide when it is time to handover the proxy responsibility to another peer node such as the second peer node 132. The existing proxy such as the first peer node 131 may re-establish its renewable energy profile e.g. by periodically checking or by checking at a specific future time instant based on a timer to be triggered when the sustainable energy source reserves will run out, e.g. the next 10 min, and decide that the re-established renewable energy profile no longer exceeds the first threshold. The SP2PSM 650 based on the DHT 600 information as well as online requests to actual potential proxy nodes such as the second and third peer nodes 132, 133 may be basis for the first peer node 131 to decide about the best proxy node or nodes. The decision is based on the renewable energy profile of the candidate peer nodes to exceed the first threshold, which may be performed by an optimization that takes into account the percentages of sustainable energy sources powering a node and future availability of sustainable energy. For example, the more sustainable energy a peer node has the better for its selection ranking, the more time the sustainable energy is available again the better for its selection ranking. The candidate peer nodes ranked based on the first threshold are also checked against the geographical or network distance between them and the user device 120. Basically a candidate peer node with similar sustainability profile over another candidate peer node may be selected as the final proxy node if it's geographical distance or if its network distance (number of communication links) to the user device 120 is shorter.

Note that the term proxy and P2P proxy are used interchangeable in this document.

Figure 7:
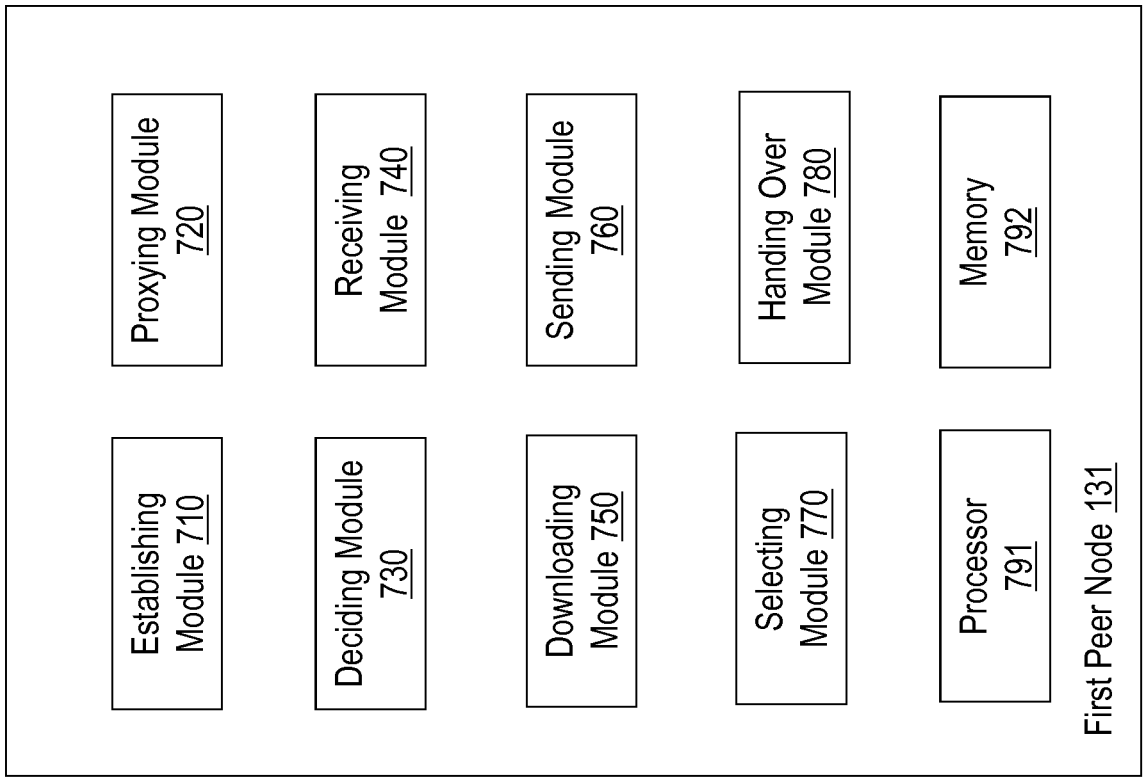
FIG. 7 is a schematic block diagram illustrating embodiments of a first peer node.

To perform the method actions, the first peer node 131 for acting as a P2P proxy for a user device 120, may comprise the following arrangement depicted in FIG. 7. As mentioned above, the first peer node 131 is operable in a communications network 100.

The first peer node 131 is configured to, e.g. by means of an establishing module 710, establish a renewable energy profile of the first peer node 131 used for powering the first peer node 131. The renewable energy profile is adapted to indicate to what extent one or more energy sources are renewable When a proportion of renewable energy according to the established renewable energy profile exceeds a first threshold, the first peer node 131 is further configured to, e.g. by means of a proxying module 720, act as a P2P proxy for the user device 120 for downloading a piece of data to the user device 120 by being powered according to its renewable energy profile.

The proportion of renewable energy according to the established renewable energy profile may be adapted to exceed the first threshold only during a time interval. The first peer node 131 is capable to act as a P2P proxy for the user device 120 during that time interval.

In some embodiments, when the first peer node 131 is capable to act as a P2P proxy for the user device 120, the first peer node 131 is further configured to, e.g. by means of a deciding module 730, decide the time interval based on obtained information relating to any one or more out of: information about the duration of daylight, trash burning, sunrise and sunset times, weather forecast that includes forecast of wind speed, sunlight, amount of clouds, amount of rain.

The first peer node 131 may be adapted to be connected to a sensor. The sensor provides availability information related to renewable energy sources. In the case that when the first peer node 131 is capable to act as a P2P proxy for the user device 120, the time period starts when the sensor modality sensed in the sensor is above a second threshold and stops when modality sensed in the sensor is below a third threshold.

In some embodiments, the first peer node 131 is further configured to, e.g. by means of a receiving module 740, receive from the user device 120, a request for downloading the piece of data.

In these embodiments, the first peer node 131 is also further configured to, e.g. by the means of a downloading module 750, download at least part of the piece of data to the user device 120, when the first peer node 131 is acting as a P2P proxy for the user device 120 and is being powered according to the established renewable energy profile.

The first peer node 131 may be further configured to, e.g. by means of a sending module 760, send information to the user device 120. The information relates to the established renewable energy profile. The first peer node 131 is selectable by the user device 120 based on the information about the established renewable energy profile.

According to some embodiments, the first peer node 131 may be further configured to, e.g. by means of the establishing module 710, re-establish the renewable energy profile of the peer node 131, the re-established renewable energy profile no longer exceeds the first threshold. In these embodiments, the first peer node 131 is further configured to, e.g. by means of a selecting module 770, select a second peer node 132 among the number of available peer nodes 131, 132, 133. Each peer node out of the number of peer nodes 131, 132, 133 is adapted to be associated with a renewable energy profile used for powering the peer node. The renewable energy profile is adapted to indicate to what extent one or more energy sources are renewable. The selecting is adapted to be based on that a proportion of renewable energy according to the renewable energy profile of the second peer node 132 exceeds the first threshold. In these embodiments, the first peer node 131 is further configured to, e.g. by means of a handing over module 780, hand over the downloading of at least a part of the piece of data not already being downloaded to the user device 120 and the acting as a P2P proxy for the user device 120, to the selected second peer node 132.

According to some embodiments, the first peer node 131 further is configured to, e.g. by means of the selecting module 770, select the second peer node 132 among the number of available peer nodes 131, 132, 133 further based on any one or more out of: the distance to the user device 120, and the future availability of renewable energy exceeding the first threshold.

The embodiments herein may be implemented through one or more processors, such as a processor 791 in the first peer node 131 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first peer node 131. One such carrier may be in the form of a CD ROM disc. It is however feasible with other data carriers such as a memory stick. The computer program code may furthermore be provided as pure program code on a server and downloaded to the first peer node 131.

The first peer node 131 may further comprise a memory 792 comprising one or more memory units. The memory 792 comprises instructions executable by the processor 791.

The memory 792 is arranged to be used to store e.g. information relating to applications and its features, selected preference level for applications, information about a current congestion level of the communications network 100, bearers set up for the application, data, and configurations, to perform the methods herein when being executed in the first peer node 131.

In some embodiments, a computer program comprises instructions, which when executed by the at least one processor 791, cause the at least one processor 791 to perform actions according to any of the Actions 201-209.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the first peer node 131, described above may refer to a combination of analog and digital circuits, and/or one or more processors 791 configured with software and/or firmware, e.g. stored in the memory 792, that when executed by the one or more processors such as the processor 791 as described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

Figure 8:
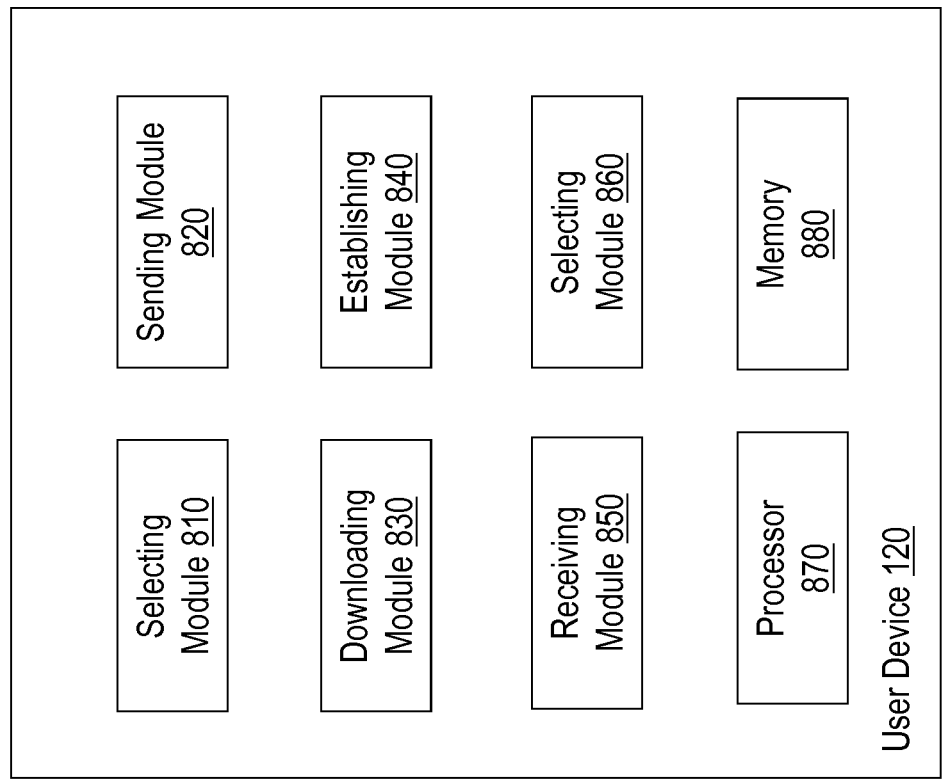
FIG. 8 is a schematic block diagram illustrating embodiments of a user device.

To perform the method actions for downloading a piece of data from a first peer node 131 acting as a P2P proxy for the user device 120, the user device 120 may comprise the following arrangement depicted in FIG. 8. As mentioned above, the first peer node 131 is operable in a communications network 100.

The user device 120 is configured to, e.g. by means of a selecting module 810, select the first peer node 131 among a number of available peer nodes 131, 132, 133. Each peer node out of the number of peer nodes 131, 132, 133 is adapted to be associated to a level of renewable energy profile. The renewable energy profile is adapted to indicate to what extent one or more renewable energy sources are used for powering the peer node 131, 132, 133. The selecting is adapted to be based on the renewable energy profile of the peer nodes 131, 132, 133. A proportion of renewable energy according to the renewable energy profile of the first peer node 131 is adapted to exceed a first threshold.

The user device 120 is also configured to, e.g. by means of a sending module 820, send to the first peer node 131, a request for downloading the piece of data.

The user device 120 is also configured to, e.g. by means of a downloading module 830, download at least part of the piece of data from the selected first peer node 131. The first peer node 131 is adapted to be powered according to its renewable energy profile.

According to some embodiments, the user device 120 may be further configured to, e.g. by means of a establishing module 840, establish an energy profile demanded by the user device 120 to be fulfilled by a peer node 131, 132, 133, which acts as a P2P proxy for the user device 120 to download the piece of data. The established energy profile is fulfilled when the proportion of renewable energy according to the renewable energy profile of the peer node exceeds the first threshold.

The first threshold may be selectable by the user device 120 for the downloading of the piece of data to the user device 120.

According to some embodiments, the proportion of renewable energy according to the renewable energy profile of the first peer node 131 may be adapted to exceed the first threshold only during a time interval. In such a case, the first peer node 131 is capable to act as a P2P proxy for the user device 120 only during that time interval. In the case that when the first peer node 131 is capable to act as a P2P proxy for the user device 120, the time period is adapted to be based on information relating to any one or more out of: information about the duration of daylight, trash burning, sunrise and sunset times, weather forecast that includes forecast of wind speed, sunlight, amount of clouds, amount of rain.

According to some embodiments, the proportion of renewable energy according to the renewable energy profile of the first peer node 131 is capable to no longer exceed the first threshold. In these embodiments, the downloading of the piece of data and the acting as a P2P proxy for the user device 120, is adapted to be handed over to a second peer node 132. The second peer node 132 is selectable by the first peer node 131 among the number of available peer nodes 131, 132, 133. Each peer node out of the number of peer nodes 131, 132, 133 is adapted to be associated to a level of renewable energy profile. The renewable energy profile is adapted to indicate to what extent one or more renewable energy sources are used for powering the peer node 131, 132, 133. The selecting is adapted to be based on that a proportion of renewable energy according to the renewable energy profile of the second peer node 132 exceeds the first threshold. In these embodiments, the user device 120 is further configured to, e.g. by means of the downloading module 830, download at least a part of the piece of data not already being downloaded to the user device 120 from the second peer node 132. The second peer node 132 is powered according to its renewable energy profile.

The user device 120 may be further configured to, e.g. by means of a receiving module 850, receive from each peer node out of the number of peer nodes 131, 132, 133, information relating to its level of renewable energy profile.

The user device 120 according to some embodiments, further is configured to, e.g. by means of a selecting module 860, select the first peer node 131 among a number of available peer nodes 131, 132, 133, further based on any one or more out of: the distance to the user device 120, and the future availability of renewable energy exceeding the first threshold.

The embodiments herein may be implemented through one or more processors, such as a processor 870 in the user device 120 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the user device 120. One such carrier may be in the form of a CD ROM disc. It is however feasible with other data carriers such as a memory stick. The computer program code may furthermore be provided as pure program code on a server and downloaded to the user device 120.

The user device 120 may further comprise a memory 880 comprising one or more memory units. The memory 880 comprises instructions executable by the processor 970.

The memory 880 is arranged to be used to store e.g. information relating to applications and its features, selected preference level for applications, information about a current congestion level of the communications network 100, bearers set up for the application, data, and configurations, to perform the methods herein when being executed in the user device 120.

In some embodiments, a computer program comprises instructions, which when executed by the at least one processor 870, cause the at least one processor 870 to perform actions according to any of the Actions 301-306.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the user device 120, described above may refer to a combination of analog and digital circuits, and/or one or more processors 870 configured with software and/or firmware, e.g. stored in the memory 880, that when executed by the one or more processors such as the processor 870 as described above. One or more of these processors, as well as the other digital hardware, may be included in a single Application-Specific Integrated Circuitry ASIC, or several processors and various digital hardware may be distributed among several separate components, whether individually packaged or assembled into a system-on-a-chip SoC.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a first peer node for acting as a peer-to-peer (P2P) proxy for a user device, wherein the first peer node operates in a communications network, the method comprising:
    establishing a renewable energy profile of the first peer node used for powering the first peer node, wherein the established renewable energy profile indicates to what extent one or more energy sources are renewable; and
    when a proportion of renewable energy according to the established renewable energy profile exceeds a first threshold, acting as a P2P proxy for the user device for downloading a piece of data to the user device by being powered according to the established renewable energy profile.

2. The method according to claim 1, wherein the proportion of renewable energy according to the established renewable energy profile exceeds the first threshold only during a time interval and wherein the first peer node is capable to act as a P2P proxy for the user device during that time interval.

3. The method according to claim 1, wherein the first peer node, is connected to a sensor, and wherein the establishing a renewable energy profile of the first peer node is further based on information related to renewable energy sources provided by the sensor.

4. The method according to claim 1, further comprising:
    receiving from the user device, a request for downloading the piece of data; and
    when acting as a P2P proxy for the user device and being powered according to the established renewable energy profile, downloading at least part of the piece of data to the user device.

5. The method according to claim 1, further comprising:
    sending information to the user device, wherein the information relates to the established renewable energy profile,
    wherein the first peer node has been selected by the user device based on the information about the established renewable energy profile.

6. The method according to claim 1, further comprising:
    re-establishing the renewable energy profile of the first peer node, wherein the re-established renewable energy profile no longer exceeds the first threshold;
    selecting a second peer node from among a number of available peer nodes, wherein each peer node out of the number of available peer nodes is associated with a renewable energy profile, wherein the renewable energy profile indicates to what extent one or more energy sources are renewable, and wherein the selecting is based on that a proportion of renewable energy according to the renewable energy profile of the second peer node exceeds the first threshold; and
    handing over the downloading of at least a part of the piece of data not already being downloaded to the user device and the acting as a P2P proxy for the user device, to the selected second peer node.

7. A method performed by a user device for downloading a piece of data from a first peer node acting as peer-to-peer (P2P) proxy for the user device, wherein the first peer node operates in a communications network, the method comprising:
    selecting the first peer node from among a number of available peer nodes, wherein each peer node out of the number of available peer nodes is associated with a renewable energy profile, wherein the renewable energy profile indicates to what extent one or more renewable energy sources are used for powering the peer node, and wherein the selecting is based on the renewable energy profile of the peer nodes, and wherein a proportion of renewable energy according to the renewable energy profile of the first peer node exceeds a first threshold;
    sending to the first peer node, a request for downloading the piece of data; and
    downloading at least part of the piece of data from the selected first peer node, wherein the first peer node is powered according to the renewable energy profile associated with the first peer node.

8. The method according to claim 7, further comprising:
    establishing an energy profile demanded by the user device to be fulfilled by a peer node to act as a P2P proxy for the user device to download the piece of data, wherein the established energy profile is fulfilled when the proportion of renewable energy according to the renewable energy profile of the peer node exceeds the first threshold.

9. The method according to claim 7,
    wherein the proportion of renewable energy according to the renewable energy profile of the first peer node no longer exceeds the first threshold, and
    wherein the downloading of the piece of data and the acting as a P2P proxy for the user device, is handed over to a second peer node, wherein the second peer node is selected by the first peer node from among the number of available peer nodes, wherein each peer node out of the number of available peer nodes is associated with a renewable energy profile that indicates to what extent one or more renewable energy sources are used for powering the peer node, and wherein the selecting is based on that a proportion of renewable energy according to the renewable energy profile of the second peer node exceeds the first threshold, the method further comprising
    downloading from the second peer node, at least a part of the piece of data not already being downloaded to the user device, wherein the second peer node is powered according to the renewable energy profile associated with the second peer node.

10. The method according to claim 7, further comprising:
    for each peer node out of the number of available peer nodes, receiving information relating to the renewable energy profile associated with the peer node.

11. A first peer node for acting as a peer-to-peer (P2P) proxy for a user device, wherein the first peer node is operable in a communications network, the first peer node being configured to:
    establish a renewable energy profile of the first peer node used for powering the first peer node, wherein the established renewable energy profile is adapted to indicate to what extent one or more energy sources are renewable; and
    when a proportion of renewable energy according to the established renewable energy profile exceeds a first threshold, act as a P2P proxy for the user device for downloading a piece of data to the user device by being powered according to the established renewable energy profile.

12. The first peer node according to claim 11, wherein the proportion of renewable energy according to the established renewable energy profile is adapted to exceed the first threshold only during a time interval, and wherein the first peer node is capable to act as a P2P proxy for the user device during that time interval.

13. The first peer node according to claim 11, wherein the first peer node is connectable to a sensor, and wherein the first peer node further is configured to establish the renewable energy profile of the first peer node further based on information related to renewable energy sources provided by the sensor.

14. The first peer node according to claim 11, further being configured to:
receive from the user device, a request for downloading the piece of data, and
when acting as a P2P proxy for the user device and being powered according to the established renewable energy profile, download at least part of the piece of data to the user device.

15. The first peer node according to claim 11, further being configured to:
send information to the user device, wherein the information relates to the established renewable energy profile, and
wherein the first peer node is selectable by the user device based on the information about the established renewable energy profile.

16. The first peer node according to claim 11, further being configured to:
re-establish the renewable energy profile of the first peer node, wherein the re-established renewable energy profile no longer exceeds the first threshold,
select a second peer node from among a number of available peer nodes, wherein each peer node out of the number of available peer nodes is adapted to be associated with a renewable energy profile, wherein the renewable energy profile is adapted to indicates to what extent one or more energy sources are renewable, and wherein the selecting is adapted to be based on that a proportion of renewable energy according to the renewable energy profile of the second peer node exceeds the first threshold, and
hand over the downloading of at least a part of the piece of data not already being downloaded to the user device and the acting as a P2P proxy for the user device, to the selected second peer node.

17. A user device for downloading a piece of data from a first peer node acting as a peer-to-peer (P2P) proxy for the user device, wherein the first peer node is operable in a communications network, the user device being configured to:
select the first peer node from among a number of available peer nodes, wherein each peer node out of the number of available peer nodes is associated with a renewable energy profile that indicates to what extent one or more renewable energy sources are used for powering the peer node, and wherein the selecting is adapted to be based on the renewable energy profile of the peer nodes, and wherein a proportion of renewable energy according to the renewable energy profile of the first peer node is adapted to exceed a first threshold;
send to the first peer node, a request for downloading the piece of data; and
download at least part of the piece of data from the selected first peer node, wherein the first peer node is adapted to be powered according to its the renewable energy profile associated with the first peer node.

18. The user device according to claim 17, further being configured to:
establish an energy profile demanded by the user device to be fulfilled by a peer node to act as a P2P proxy for the user device to download the piece of data, wherein the established energy profile is fulfilled when the proportion of renewable energy according to the renewable energy profile of the peer node exceeds the first threshold.

19. The user device according to claim 17,
wherein the proportion of renewable energy according to the renewable energy profile of the first peer node is capable to no longer exceed the first threshold, and
wherein the downloading of the piece of data and the acting as a P2P proxy for the user device, is adapted to be handed over to a second peer node, wherein the second peer node is selectable by the first peer node from among the number of available peer nodes, wherein each peer node out of the number of available peer nodes is adapted to be associated with a renewable energy profile, wherein the renewable energy profile is adapted to indicate to what extent one or more renewable energy sources are used for powering the peer node, and wherein the selecting is adapted to be based on that a proportion of renewable energy according to the renewable energy profile of the second peer node exceeds the first threshold, the user device further being configured to:
download from the second peer node at least a part of the piece of data not already being downloaded to the user device, wherein the second peer node is powered according to the renewable energy profile associated with the second peer node.

20. The user device according to claim 17, further being configured to:
for each peer node out of the number of available peer nodes, receive information relating to the renewable energy profile associated with the peer node.

* * * * *